United States Patent [19]

Decker et al.

[11] Patent Number: 4,986,674

[45] Date of Patent: Jan. 22, 1991

[54] VEHICLE ACCESSORY GLIDE APPARATUS

[75] Inventors: John H. Decker, Livonia; Eugene M. Halajian, Mt. Clemens, both of Mich.

[73] Assignee: Irvin Automotive Products, Inc., Auburn Hills, Mich.

[21] Appl. No.: 499,663

[22] Filed: Mar. 27, 1990

Related U.S. Application Data

[63] Continuation-in-part of Ser. No. 461,327, Jan. 5, 1990, abandoned.

[51] Int. Cl.$^5$ .............................................. F16C 29/02
[52] U.S. Cl. ......................................... 384/10; 384/23
[58] Field of Search ........................ 384/10, 23, 17, 42, 384/34; 312/344, 350

[56] References Cited

U.S. PATENT DOCUMENTS

| | | | |
|---|---|---|---|
| 1,952,379 | 3/1934 | Lee | 384/10 |
| 3,477,770 | 11/1969 | Niemi | 384/23 |
| 3,586,394 | 6/1971 | Hecksel | 384/23 |

OTHER PUBLICATIONS

Photographs of automotive console part (no date).

Primary Examiner—Lenard A. Footland
Attorney, Agent, or Firm—Harness, Dickey & Pierce

[57] ABSTRACT

A glide apparatus for an assembly, such as a vehicle interior accessory, includes a first member disposed for slidable relative movement with respect to a second member. The first member has a longitudinally-extending, generally channel-shaped portion defined a base and a pair of spaced-apart legs protruding laterally outwardly from the base. A glide member preferably includes a number of serially-arranged arcuate slide portions at least partially fixed relative to a backing plate and curving laterally outwardly from the backing plate for relative slidable engagement with at least one, or both, of the legs on the channel-shaped portion of the first member. Preferably, a number of second arcuate slide portions are at least partially fixed relative to the backing plate and curve laterally outwardly from the backing plate for relative slidable engagement with the base of the channel-shaped portion of the first member. At least the second arcuate slide portions, which are adapted for slidable engagement with the base of the channel-shaped portion, are laterally resilient in order to resiliently bias the first member in a lateral direction away from the second member, and preferably have generally arcuate shaped convex protrusions positioned for engaging the channel base substantially in a "point-contact" engagement therewith.

37 Claims, 3 Drawing Sheets

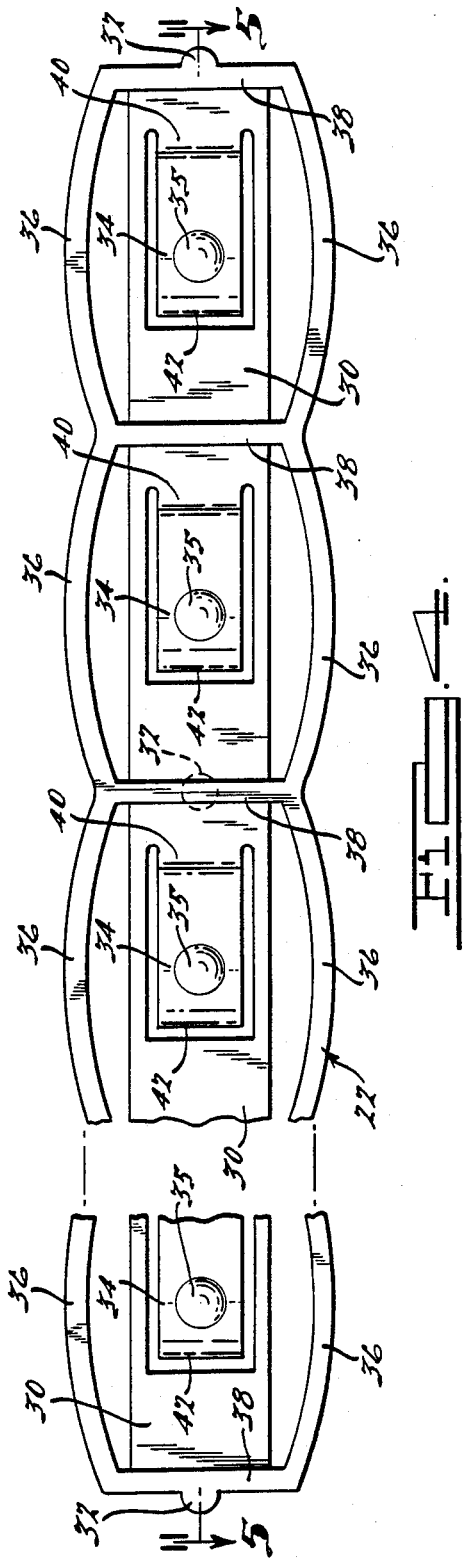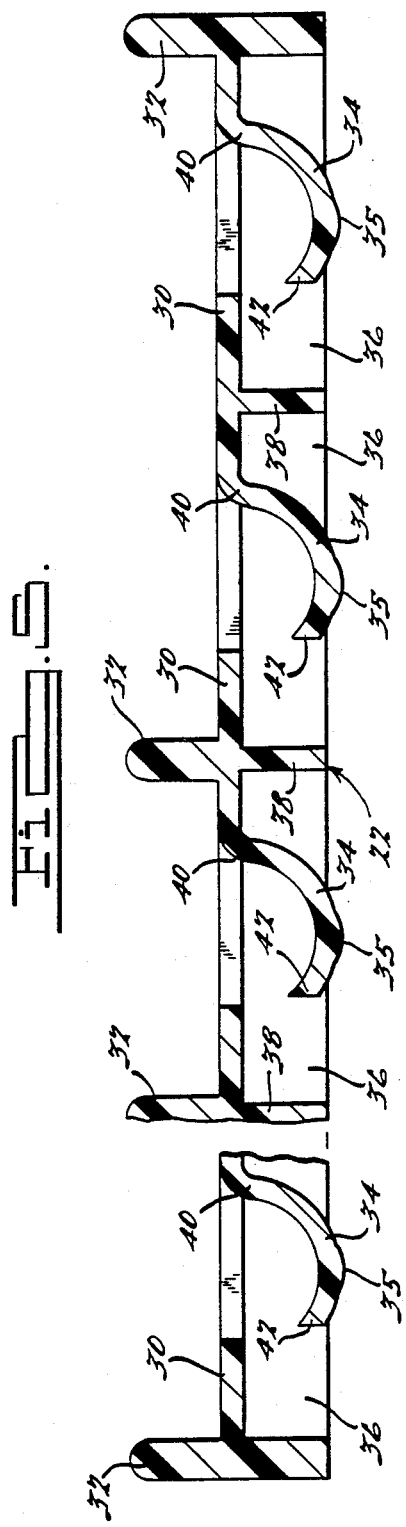

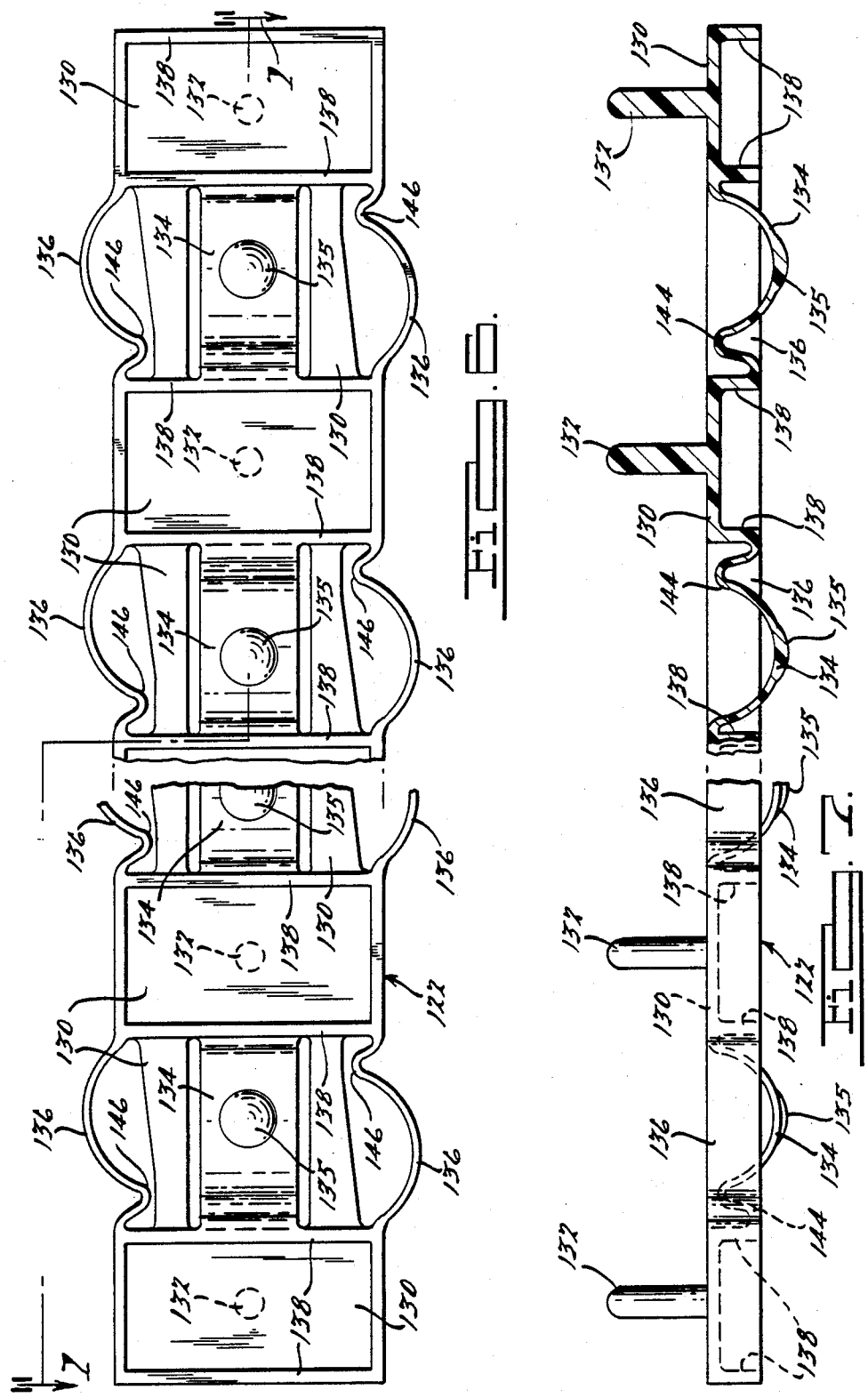

VEHICLE ACCESSORY GLIDE APPARATUS

This is a continuation-in-part of a copending application, Ser. No. 461,327, filed Jan. 5, 1990, now abandoned, the disclosure of which is expressly incorporated by reference herein.

BACKGROUND AND SUMMARY OF THE INVENTION

The present invention relates generally to a glide apparatus for slidably interconnecting a first member with a second member for slidable relative movement therebetween. The glide apparatus of the present invention is especially well-suited for slidable vehicle interior accessories, such as interior console drawers for storage of maps or other such items, sliding accessory doors, or other accessories wherein a first member is disposed for slidable relative movement with respect to a second member.

An increasing interest and demand has arisen for various vehicle interior accessories, such as storage trays or drawers, sliding doors for concealing storage compartments, or other slidably movable accessories. Considerations such as the reduction of vehicle weight for fuel economy, the lowering of manufacturing and installation costs associated with the provision of such accessories, and enhanced durability and product integrity have led to the need for lightweight accessory components that are inexpensive to manufacture and install, and that are both durable and smooth in operation, thus contributing to the overall perception of quality associated with such accessories.

In order to address these requirements and objectives, the present invention seeks to provide a glide apparatus for an assembly, such as a vehicle interior accessory, having a first member disposed for slidable relative movement with respect to a second member. The first member has a longitudinally-extending, generally channel-shaped portion defined a base and a pair of spaced-apart legs protruding laterally outwardly from the base. A glide member preferably includes a number of serially-arranged arcuate slide portions at least partially fixed relative to a backing plate and curving laterally outwardly from the backing plate for relative slidable engagement with at least one, or both, of the legs on the channel-shaped portion of the first member. Preferably, a number of second arcuate slide portions are at least partially fixed relative to the backing plate and curve laterally outwardly from the backing plate for relative slidable engagement with the base of the channel-shaped portion of the first member. At least the second arcuate slide portions, which are adapted for slidable engagement with the base of the channel-shaped portion, are laterally resilient in order to resiliently bias the first member in a lateral direction away from the second member. Preferably, these second arcuate slide portions contain at least one generally spherically or arcuately shaped, convex protrusion positioned such that each protrusion contacts the base of the channel-shaped portion, substantially at a "single point" when the glide member and channel-shaped portion are slidably engaged.

In one exemplary application of the present invention, a drawer has one of the generally channel-shaped portions disposed on each of the drawer's opposite sides, with a drawer receptacle having an opening defined by at least a pair of spaced-apart sidewalls, with one of the above-mentioned glide members disposed on each sidewall for slidable engagement with the channel-shaped portions on the drawer. Alternatively, the channel-shaped portions can be disposed on the receptacle opening sidewalls, with the glide members being disposed on the drawer sides. In such arrangements, the laterally resilient arcuate slide portions serve to resiliently bias the opposite sides of the drawer toward one another, thus taking up side-to-side play or clearance and providing for smooth sliding movement of the drawer into and out of the drawer receptacle.

Additional objects, advantages, and features of the present invention will become apparent from the following description and the appended claims, taken in conjunction with the accompanying drawings.

BRIEF DESCRIPTION OF THE DRAWINGS

FIG. 4 is a front view of the glide member of FIG. 3.

FIG. 5 is a cross-sectional view taken generally along lines 5—5 of FIG. 4.

FIG. 6 is a front view, similar to that of FIG. 4, but illustrating an alternate glide member of the present invention.

FIG. 7 is a cross-sectional view taken generally along lines 7—7 of FIG. 6.

DETAILED DESCRIPTION OF THE PREFERRED EMBODIMENTS

Figure 1:
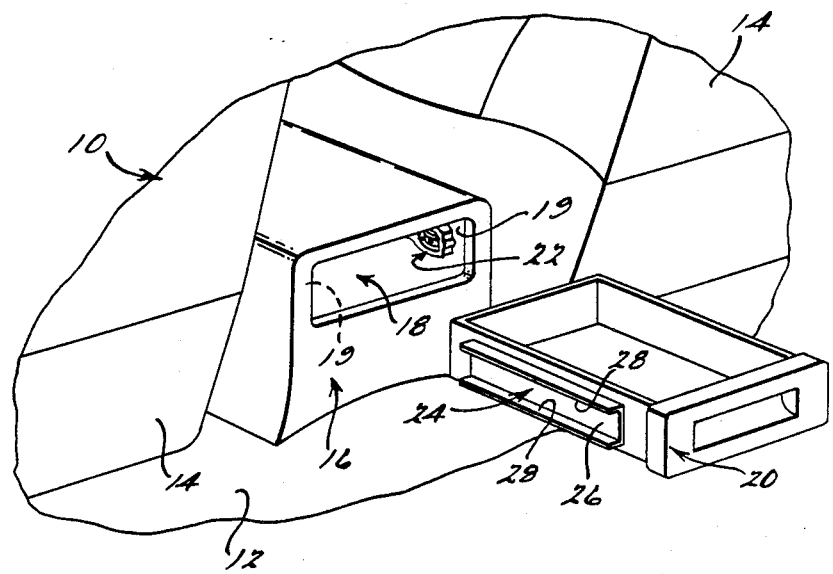
FIG. 1 is a partial perspective view of an exemplary vehicle interior, incorporating the glide apparatus of the present invention providing for slidable movement of an interior console drawer.

FIGS. 1 through 7 illustrate an exemplary embodiment of a glide apparatus according to the present invention, shown for purposes of illustration as applied in a vehicle interior accessory drawer-and-console assembly, providing for smooth, slidable relative movement of the drawer into and out of the drawer receptacle in the console. One skilled in the art will readily recognize from the following discussion, as well as from the accompanying drawings, that the present invention is not limited to the exemplary glide apparatus depicted for purposes of illustration in the drawings, and that the glide apparatus according to the present invention is equally applicable to other vehicle interior accessories, as well as to other slidable relative movement applications.

Figure 2:
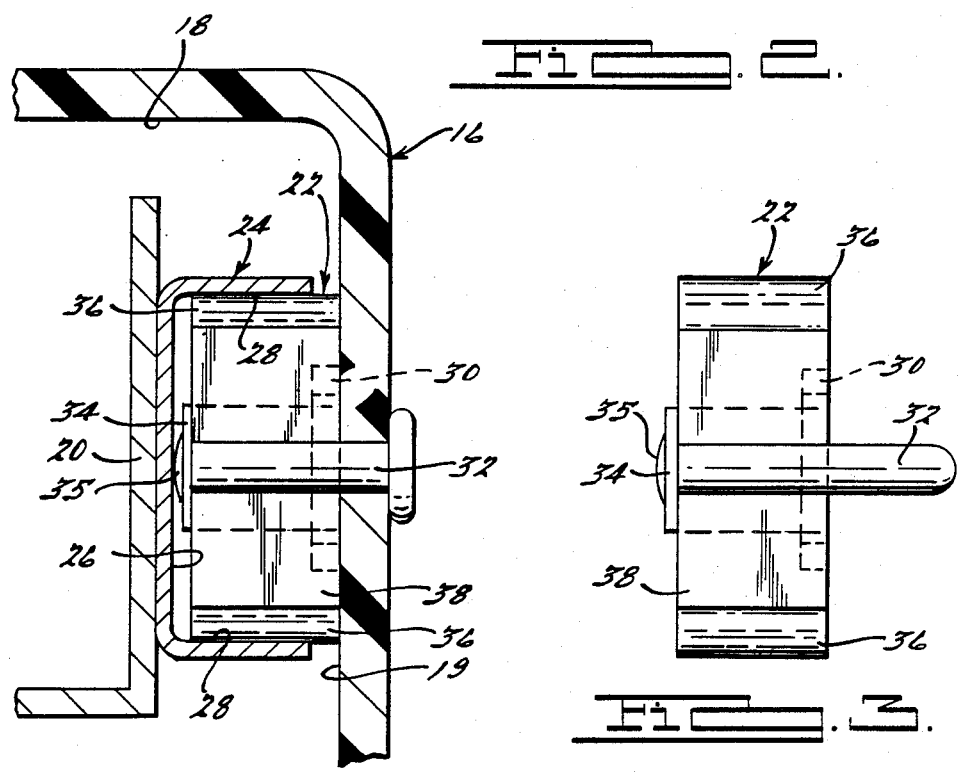
FIG. 2 is a partial, detailed, cross-sectional view of an exemplary glide apparatus according to the present invention disposed for slidably interconnecting the drawer of FIG. 1 with the console receptacle.

In FIG. 1, a portion of an exemplary vehicle interior 10 is depicted, including a floor 12, and a pair of spaced-apart seats 14, with a console assembly 16 disposed therebetween. The console assembly 16 includes a receptacle opening 18, at least in part defined by a pair of sidewalls 19, and a storage or package drawer 20 adapted to be slidably received within the receptacle opening 18. In the illustrated exemplary application, each of the sidewalls 19 includes a glide member 22 fixed thereto for relative slidable engagement with a glide channel 24 on each of opposite sides of the drawer 20. As shown in FIGS. 1 and 2, the preferred glide channel 24 includes a base 26 interconnecting a pair of spaced-apart legs 28.

The glide member 22, which is perhaps best shown in FIGS. 2 through 5, is adapted to be mounted in a longitudinally-extending disposition on each sidewall 19 of the receptacle opening 18 shown in FIG. 1. Each of the glide members 22 includes a longitudinally-extending backing plate 30, and a number of mounting posts 32 for fixedly interconnecting the glide member 22 with its respective sidewall 19, such as by heat staking, as illustrated in FIG. 2, swaging, or other fastening means known to those skilled in the art.

Figure 3:
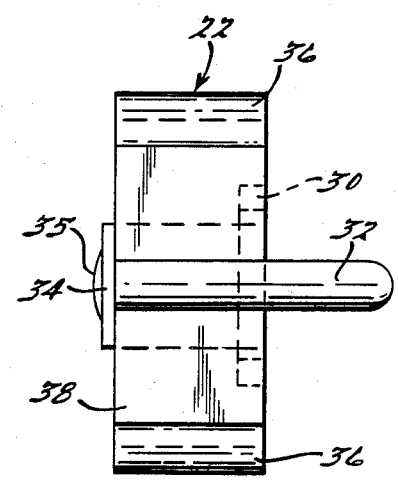
FIG. 3 is an end view of a glide apparatus according to the present invention.

In the preferred form of the glide member 22, as shown in FIGS. 2 through 4, a number of arcuate slides 36 are at least partially fixedly interconnected with the packing plate 30 and serially arranged along opposite lateral sides of the longitudinal length of the glide member 22. The arcuate slides 36 on opposite sides of the glide member 22 are preferably interconnected by a number of longitudinally spaced-apart lateral reinforcing portions 38, with at least one of the reinforcing portions 38 being disposed generally between longitudinally-adjacent arcuate slides 36. The arcuate slides 36 engage at least one of the legs 28 of the glide channel 24 and function to provide a relatively low-friction engagement therebetween, as well as serving to maintain the drawer 20 in a properly aligned orientation, during sliding movement into and out of the receptacle opening 18.

The glide member 22 also includes a number of second arcuate slides 34 at least partially fixed relative to the backing plate 30, and configured in a laterally-outwardly curving relationship with the backing plate 30 for relative slidable engagement with the base 26 of the glide channel 24. Preferably, the arcuate slides 34 are composed of a resilient material and are laterally defectable in order to resiliently bias the glide channel 24 in a direction away from the backing plate 30. In addition, the preferably resilient arcuate slides 34 are generally cantilevered laterally outwardly from the backing plate 30 and have a restrained end 40 and an unrestrained end 42. Thus, by way of the resilient biasing of the glide channel 24 away from the backing plate 30 and thus away from the receptacle opening sidewalls 19, the arcuate slides 34 serve to resiliently maintain the drawer 20 in an intermediate position within the receptacle opening 18, taking up side-to-side play or clearance between the drawer 20 and the receptacle opening sidewalls 19. Preferably, the arcuate slides 34 contain at least one generally spherically or arcuately shaped convex protrusion 35 positioned such that each protrusion contacts the base 26 of the glide channel 24 substantially at a "single point" when slidably engaged therewith. In addition, both the arcuate slides 34 and the arcuate slides 36 are preferably composed of a material having a low coefficient of friction and a high degree of lubricity, such as a preferred acetal material or alternately a nylon or teflon material. As an alternate construction, the glide member 22 can be fabricated of a smooth, polished spring steel or other such suitable resilient material having a low coefficient of friction, and high degree of lubricity, such as those materials well-known to those skilled in the art.

It should further be emphasized that the arcuate configuration of the arcuate slides 36 contributes to the smooth operation of the sliding drawer 20, due to the fact that only the high points of the convex arcuate slides 36 are contacted by the legs 28 of the glide channel 24, resulting in a generally line-contact engagement therebetween. Similarly, the resilient arcuate slides 34 contribute to the smooth operation of the sliding drawer 20, due to the fact that only the high points of the convex protrusions 35 on the arcuate slides 34 are contacted by the base 26 of the glide channel 24, resulting substantially in a "point-contact" engagement therebetween. Thus, the glide member 22 of the present invention provides for a smooth, low-friction slidable relative engagement with the glide channel 24, as well as functioning to maintain proper alignment of the drawer 20 within the receptacle opening 18, both side-to-side and top-to-bottom. In this regard, it should be emphasized that the applicability of the glide apparatus according to the present invention is not limited to horizontally sliding relative movement between two members, such as that shown in the exemplary application depicted in the drawings, but rather that the glide apparatus according to the present invention can also be advantageously employed in slidable relative movement applications having other orientations.

FIGS. 6 and 7 illustrate one exemplary alternate embodiment of the glide member of the present invention. In FIGS. 6 and 7 a glide member 122 is somewhat similar, both in function and in configuration, to the glide member 22 shown in FIGS. 1 through 5, with certain exceptions discussed below. Thus, various components of the glide member 122 that are similar or corresponding in function to components of the glide apparatus 22 are indicated by reference numerals that are the same as those of the glide member 22, but that have a one-hundred prefix. In the glide member 122 of FIGS. 6 and 7, each of the preferably resilient arcuate slides 134 includes a generally serpentine portion 144 at one end thereof. In addition, the resilient arcuate slide portions 134 are preferably restrained at both ends. By providing such serpentine portions 144, the arcuate slides 134 are resiliently deflectable toward and away from the backing plate 130.

Similarly, in contrast to the glide member 22 of FIGS. 1 through 5, the arcuate slides 136 of the glide member 122 include similar serpentine portions 146, which are preferably disposed at one end of each of the arcuate slides 136. The provision of the serpentine portions 146 on the arcuate slides 136 allows for lateral resilient deflection of the arcuate slides 136 in directions toward and away from the legs of the glide channel (now shown). Such an arrangement may be highly desirable or advantageous in applications where play or clearance between the glide channel legs must be taken up and accommodated in order to provide for smooth sliding operation of a drawer or other slidable member.

Like the glide member 22, the alternate glide member 122 is preferably composed of acetal, nylon, or teflon, having a low coefficient of friction and a high degree of lubricity, but can alternately be fabricated from polished spring steel or other suitable resilient materials having low coefficients of friction and high degrees of lubricity.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A glide apparatus for an assembly having a first member disposed for slidable relative movement with respect to a second member, the first member having a longitudinally-extending, generally channel-shaped portion defined by a base and spaced-apart legs protruding laterally outwardly therefrom, said glide apparatus including a number of first arcuate slide portions at least partially fixed relative to the second member and curving laterally outwardly therefrom for relative slidable engagement with at least one of the legs on the first member, and a number of second arcuate slide portions having a restrained end restrained at least from laterally inward movement toward the second member and fixed relative to the second member, said second arcuate slide portions curving laterally outwardly therefrom to a free end laterally unrestrained relative to the second member for deflectable relative slidable engagement with the base on the first member.

2. A glide apparatus according to claim 1, wherein said second arcuate slide portions are laterally resilient for resiliently biasing the first member in a lateral direction away from the second member.

3. A glide apparatus according to claim 1, wherein said first and second arcuate slide portions are composed of an acetal-bearing material.

4. A glide apparatus according to claim 1, wherein the first member includes a drawer having one of the generally channel-shaped portions disposed on each of opposite sides of said drawer, and wherein the second member includes a drawer receptacle having an opening therein for slidably receiving said drawer and having a number of said first and second arcuate slide portions disposed on each of opposite sides of said opening for said relative slidable engagement with said channel-shaped portions.

5. A glide apparatus according to claim 4, wherein said second arcuate slide portions contain at least one generally arcuately shaped convex protrusion positioned such that said protrusion contacts said base of said channel-shaped portion.

6. A glide apparatus according to claim 4, wherein said second arcuate slide portions are laterally resilient and resiliently engage the base on each of said opposite sides of said drawer in order to resiliently bias said drawer toward an intermediate position within said opening in said drawer receptacle.

7. A glide apparatus according to claim 6, wherein said second arcuate slide portions contain at least one generally arcuately shaped convex protrusion positioned such that said protrusion contacts said base of said channel-shaped portion.

8. A glide apparatus according to claim 1, wherein the second member includes a drawer having a number of said first and second arcuate slide portions being disposed on each of opposite sides of said drawer, and wherein the first member includes a drawer receptacle having an opening therein for slidably receiving said drawer and having one of the generally channel-shaped portions disposed on each of opposite sides of said opening for said relative slidable engagement with first and second arcuate slide portions.

9. A glide apparatus according to claim 8, wherein said second arcuate slide portions contain at least one generally arcuately shaped convex protrusion positioned such that said protrusion contacts said base of said channel-shaped portion.

10. A glide apparatus according to claim 8, wherein said second arcuate slide portions are laterally resilient and resiliently engage the base on each of said opposite sides of said drawer opening in order to resiliently bias said drawer toward an intermediate position within said opening in said drawer receptacle.

11. A glide apparatus according to claim 10, wherein said second arcuate slide portions contain at least one generally arcuately shaped convex protrusion positioned such that said protrusion contacts said base of said channel-shaped portion.

12. A glide apparatus for an assembly having a first member disposed for slidable relative movement with respect to a second member, the first member having a longitudinally-extending, generally channel-shaped portion defined by a base and spaced-apart legs protruding laterally outwardly therefrom, said glide apparatus including a number of first arcuate slide portions at least partially fixed relative to the second member and curving laterally outwardly therefrom for relative slidable engagement with at least one of the legs on the first member, and a number of second arcuate slide portions at least partially fixed relative to the second member and curving laterally outwardly therefrom for relative slidable engagement with the base on the first member, said second arcuate slide portions containing at least one generally arcuately shaped convex protrusion positioned such that said protrusion contacts said base of said channel-shaped portion.

13. A glide apparatus according to claim 1, wherein said second arcuate slide portions contain at least one generally arcuately shaped convex protrusion positioned such that said protrusion contacts said base of said channel-shaped portion.

14. A glide apparatus according to claim 1, wherein said glide apparatus includes a number of said first arcuate slide portions serially arranged longitudinally along opposite lateral sides thereof and curving laterally outwardly therefrom, and a number of said second arcuate slide portions serially arranged longitudinally therealong between said opposite lateral sides.

15. A glide apparatus according to claim 14, wherein said second arcuate slide portions are laterally resilient for resiliently biasing the first member in a lateral direction away from the second member.

16. A glide apparatus according to claim 15, wherein said second arcuate slide portions contain at least one generally arcuately shaped convex protrusion positioned such that said protrusion contacts said base of said channel-shaped portion.

17. A glide apparatus according to claim 14, wherein said glide apparatus further includes a number of longitudinally spaced-apart lateral reinforcing portions interconnecting said opposite lateral sides, at least one of said reinforcing portions between disposed generally between longitudinally-adjacent first arcuate slide portions.

18. A glide apparatus according to claim 17, wherein said second arcuate slide portions contain at least one generally arcuately shaped convex protrusion positioned such that said protrusion contacts said base of said channel-shaped portion.

19. A glide apparatus according to claim 1, wherein said first and second arcuate slide portions are composed of a material having a low coefficient of friction.

20. A glide apparatus for an assembly having a drawer disposed for slidable relative movement with respect to a drawer receptacle, the drawer having a longitudinally-extending, generally channel-shaped portion defined by a base and spaced-apart legs protruding laterally outwardly therefrom, said glide apparatus including a backing plate, a number of first arcuate slide portions at least partially fixed relative to said backing plate, with said backing plate being adapted for interconnection with the drawer receptacle, said first arcuate slide portions curving laterally outwardly from said backing plate for relative slidable engagement with at least one of the legs on the channel-shaped portion of the drawer, and a number of second arcuate slide portions at least partially fixed relative to said backing plate and curving laterally outwardly therefrom for relative slidable engagement with the base on the channel-shaped portion of the drawer, said second arcuate slide portions containing at least one generally arcuately shaped convex protrusion positioned such that said protrusion contacts said base of said channel-shaped portion.

21. A glide apparatus for an assembly having a drawer disposed for slidable relative movement with respect to a drawer receptacle, the drawer having a longitudinally-extending, generally channel-shaped portion defined by a base and spaced-apart legs protruding laterally outwardly therefrom, said glide apparatus including a backing plate, a number of first arcuate slide portions at least partially fixed relative to said backing plate, with said backing plate being adapted for interconnection with the drawer receptacle, said first arcuate slide portions curving laterally outwardly from said backing plate for relative slidable engagement with at least one of the legs on the channel-shaped portion of the drawer, and a number of second arcuate slide portions having a restrained end restrained at least from laterally inward movement toward said backing plate and fixed relative to said backing plate, said second arcuate slide portions curving laterally outwardly therefrom to a free end laterally unrestrained relative to said backing plate for deflectable relative slidable engagement with the base on the channel-shaped portion of the drawer.

22. A glide apparatus according to claim 21, wherein said second arcuate slide portions are laterally resilient for resiliently biasing opposite sides of the drawer in a lateral direction away from the drawer receptacle in order to resiliently bias the drawer toward an intermediate position with respect to the drawer receptacle.

23. A glide apparatus according to claim 21, wherein said glide apparatus includes a number of said first arcuate slide portions serially arranged longitudinally along opposite lateral sides thereof and curving laterally outwardly therefrom, and a number of said second arcuate slide portions serially arranged longitudinally therealong between said opposite lateral sides.

24. A glide apparatus according to claim 23, wherein said second arcuate slide portions contain at least one generally arcuately shaped convex protrusion positioned such that said protrusion contacts said base of said channel-shaped portion.

25. A glide apparatus according to claim 23, wherein said glide apparatus further includes a number of longitudinally spaced-apart lateral reinforcing portions interconnecting said opposite lateral sides, at least one of said reinforcing portions between disposed generally between longitudinally-adjacent first arcuate slide portions.

26. A glide apparatus according to claim 25, wherein said second arcuate slide portions contain at least one generally arcuately shaped convex protrusion positioned such that said protrusion contacts said base of said channel-shaped portion.

27. A glide apparatus according to claim 26, wherein said first and second arcuate slide portions are composed of a material having a low coefficient of friction.

28. A glide apparatus according to claim 26, wherein said first and second arcuate slide portions are composed of an acetal-bearing material.

29. A glide apparatus for an assembly having a drawer disposed for slidable relative movement with respect to a drawer receptacle, the drawer receptacle having a longitudinally-extending, generally channel-shaped portion defined by a base and spaced-apart legs protruding laterally outwardly therefrom, said glide apparatus including a backing plate, a number of first arcuate slide portions at least partially fixed relative to said backing plate, with said backing plate being adapted for interconnection with the drawer, said first arcuate slide portions curving laterally outwardly from said backing plate for relative slidable engagement with at least one of the legs on the channel-shaped portion of the drawer receptacle, and a number of second arcuate slide portions having a restrained end restrained at least from laterally inward movement toward said backing plate and fixed relative to said backing plate, said second arcuate slide portions curving laterally outwardly therefrom to a free end laterally unrestrained relative to said backing plate for deflectable relative slidable engagement with the base on the channel-shaped portion of the drawer receptacle.

30. A glide apparatus according to claim 29, wherein said second arcuate slide portion are laterally resilient for resiliently biasing opposite sides of the drawer in a lateral direction away from the drawer receptacle in order to resiliently bias the drawer toward an intermediate position with respect to the drawer receptacle.

31. A glide apparatus according to claim 29, wherein said glide apparatus includes a number of said first arcuate slide portions serially arranged longitudinally along opposite lateral sides thereof and curving laterally outwardly therefrom, and a number of said second arcuate slide portions serially arranged longitudinally therealong between said opposite lateral sides.

32. A glide apparatus according to claim 31, wherein said second arcuate slide portions contain at least one generally arcuately shaped convex protrusion positioned such that said protrusion contacts said base of said channel-shaped portion.

33. A glide apparatus according to claim 31, wherein said glide apparatus further includes a number of longitudinally spaced-apart lateral reinforcing portions interconnecting said opposite lateral sides, at least one of said reinforcing portions between disposed generally between longitudinally-adjacent first arcuate slide portions.

34. A glide apparatus according to claim 33, wherein said second arcuate slide portions contain at least one generally arcuately shaped convex protrusion positioned such that said protrusion contacts said base of said channel-shaped portion.

35. A glide apparatus according to claim 34, wherein said first and second arcuate slide portions are composed of a material having a low coefficient of friction.

36. A glide apparatus according to claim 34, wherein said first and second arcuate slide portions are composed of an acetal-bearing material.

37. A glide apparatus for an assembly having a drawer disposed for slidable relative movement with respect to a drawer receptacle, the drawer receptacle having a longitudinally-extending, generally channel-shaped portion defined by a base and spaced-apart legs protruding laterally outwardly therefrom, said glide apparatus including a backing plate, a number of first arcuate slide portions at least partially fixed relative to said backing plate, with said backing plate being adapted for interconnection with the drawer, said first arcuate slide portions curving laterally outwardly from said backing plate for relative slidable engagement with at least one of the legs on the channel-shaped portion of the drawer receptacle, and a number of second arcuate slide portions at least partially fixed relative to said backing plate and curving laterally outwardly therefrom for relative slidable engagement with the base on the channel-shaped portion of the drawer receptacle, said second arcuate slide portions containing at least one generally arcuately shaped convex protrusion positioned such that said protrusion contacts said base of said channel-shaped portion.

* * * * *

UNITED STATES PATENT AND TRADEMARK OFFICE
CERTIFICATE OF CORRECTION

PATENT NO. : 4,986,674

DATED : January 22, 1991

INVENTOR(S) : Decker, et al

It is certified that error appears in the above-identified patent and that said Letters Patent is hereby corrected as shown below:

Abstract line 5, after "defined" insert --by--.

Column 1, line 40, after "defined" insert --by--.

Column 3, line 14, "packing" should be --backing--.

Column 3, lines 34-35, "defectable" should be --deflectable--.

Column 6, line 51, Claim 17, "between" should be --being--.

Column 7, line 61, Claim 25, "between" should be --being--.

Column 8, line 30, Claim 30, "portion" should be --portions--.

Column 8, line 51, Claim 33, "between" should be --being--.

Signed and Sealed this

Twenty-fourth Day of November, 1992

Attest:

DOUGLAS B. COMER

Attesting Officer

Acting Commissioner of Patents and Trademarks